United States Patent [19]
Saikalis et al.

[11] Patent Number: 5,148,788
[45] Date of Patent: Sep. 22, 1992

[54] AIR-ASSIST FUEL INJECTION SYSTEM

[75] Inventors: George Saikalis, West Bloomfield; Teruo Yamauchi, Farmington Hills; Robert W. Byers, Redford, all of Mich.

[73] Assignee: Hitachi America, Ltd., Tarrytown, N.Y.

[21] Appl. No.: 717,517

[22] Filed: Jun. 19, 1991

[51] Int. Cl.$^5$ .................. F02D 41/16; F02M 23/04
[52] U.S. Cl. .................... 123/339; 123/478; 123/585
[58] Field of Search .......... 123/339, 472, 531, 533, 123/585, 590, 478

[56] References Cited

U.S. PATENT DOCUMENTS

| | | | |
|---|---|---|---|
| 4,756,293 | 7/1988 | Suzuki et al. | 123/533 X |
| 4,969,435 | 11/1990 | Morikawa et al. | 123/533 X |
| 5,024,201 | 6/1991 | Kobayashi et al. | 123/585 X |
| 5,027,778 | 7/1991 | Nogi et al. | 123/531 X |

FOREIGN PATENT DOCUMENTS

106356  5/1988  Japan .................. 123/585

Primary Examiner—Tony M. Argenbright
Attorney, Agent, or Firm—Antonelli, Terry, Stout & Kraus

[57] ABSTRACT

An air-assist fuel injection system controls the supply of compressed air to the fuel injectors according to the operating status of internal combustion engine. For cold start operation, compressed air is supplied continuously to the injectors; while, for partial load (cruising) and partial acceleration, air is supplied as a pulsating (air volume control) flow consisting of air pulses coincident with the injected fuel pulses. On the other hand, for acceleration and deceleration, the supply of compressed air to the injectors may be inhibited. Further, idle speed control can be achieved using the air-assist to the fuel injectors, thereby eliminating need for a separate idle speed control valve. To enhance system operation, a fuel injector may be employed in which both the fuel and the applied compressed air are swirled, but in opposite directions, so as to achieve a fuel spray of small particle size.

34 Claims, 10 Drawing Sheets

| ROAD/OPERATION STATUS | AIR ASSIST VALVE STATUS | AIR PULSE TIMING |
|---|---|---|
| COLD START | ON | CONTINUOUS |
| PARTIAL LOAD (CRUISING) | ON | PULSATING (AIR VOLUME CONTROL) |
| PARTIAL ACCELERATION | ON | PULSATING (AIR VOLUME CONTROL) |
| PARTIAL DECELERATION | OFF | CLOSED |
| ACCELERATION | OFF | CLOSED |
| DECELERATION | OFF | CLOSED |
| IDLE (700 RPM) | ON | PULSATING (AIR VOLUME CONTROL) |

AIR-ASSIST FUEL INJECTION SYSTEM

BACKGROUND OF THE INVENTION

The present invention relates in general to the operation and control of internal combustion engines More particularly, the invention provides an improved air-assisted fuel injection system and a fuel injector for use in that system.

In recent years, both federal and state governments have enacted laws and established regulations which impose even greater restrictions on the performance of motor vehicles in the areas of exhaust gas emission and fuel economy. Great strides have been made in developing control systems and components for internal combustion engines in an effort to meet these requirements. Most notable have been the advances made in fuel injection systems and in fuel injectors themselves.

In developing new fuel injection systems, emphasis has been placed on more precise fuel metering to each cylinder of the internal combustion engine to not only achieve a greater fuel economy, but also to improve the efficiency of combustion leading to reduced components of $NO_x$, HC, CO and $CO_2$ in the exhaust emission. Further advances have also been made in development of fuel injectors capable of producing a fuel spray of reduced particle size, which increases the combustion efficiency and enhances cold start performance of the engine.

One type of fuel injection system which is attracting attention once again is the air-assisted system in which air under pressure is supplied to the fuel injectors to mix with the liquid fuel for purposes of achieving higher levels of atomization. One of the earlier attempts at achieving greater atomization of fuel is described in the LaFlaive U.S. Pat. No. 1,027,054, issued May 21, 1912 which discloses needle valve injector in which compressed air and liquid fuel are mixed in an annular chamber and the resulting air-fuel mixture is then injected in response to the pressure of the injecting air through a plurality of tangentially arranged slots at an exit opening of the injector. Metering of the air-fuel mixture is effected by displacing the needle valve with respect to the exit opening.

Later efforts to improve air-assist fuel injection to achieve smaller particle size involved a swirling or rotating of the air and/or fuel streams to more efficiently break up the fuel particles being injected. As an example, the Boltz et al U.S. Pat. No. 3,872,639 provides a fuel injection apparatus in which fuel is injected through an orifice to produce a spray of relatively large particles in a cylindrical first chamber which communicates with a coaxial frustro-conical second chamber into which an air stream is introduced in a tangential direction so as to produce an air swirl into which the fuel spray from the cylindrical first chamber mixes. The resulting swirling air-fuel mixture is discharged through an exit opening in the second chamber under the pressure of injecting air. Thus, Boltz et al provides for swirling of the air before introducing the spray of fuel therein to further reduce the fuel particle size in the injected spray.

Air-assist fuel injectors are also disclosed in the Eckert U.S. Pat. No. 3,656,693, issued Apr. 18, 1972, the Schweizer U.S. Pat. No. 4,351,304, issued Sept. 28, 1982, and the Knapp et al U.S. Pat. No. 4,361,126, issued Nov. 30, 1982, and all assigned to Robert Bosch GmbH. In Eckert, fuel is first swirled and then mixed with radially directed air streams to produce an air-fuel mixture which is injected through a nozzle opening to form a fuel spray. Thus, in contrast to Boltz et al, in the Eckert injector, the fuel is swirled, but not the air, prior to mixture In the later Schweizer and Knapp et al patents, air-assist injectors are disclosed in which neither the fuel nor the air is swirled prior to mixture.

The Simmons et al U.S. Pat. No. 3,474,970, issued Oct. 28, 1969, discloses an air-assist nozzle designed primarily for use in aircraft gas turbines in which a concentric conical air stream and conical fuel sheet are merged at the exit orifice of a nozzle to provide good atomization of fuels having a wide range of viscosities under various temperature and air pressure conditions. In the Matsuoka et al U.S. Pat. No. 4,434,766, issued May 6, 1984, an air-assist fuel injector is provided with tangentially arranged air intake ports of various size and configuration for producing a swirling air flow into which a fuel spray is injected.

In providing a source of pressurized air to an air-assist fuel injector, it has been common to tap air from a point in the intake manifold, typically downstream of the air-flow sensor and upstream of the throttle valve. However, to ensure a sufficient supply of air it has been proposed additionally to use an air pump to enhance the air pressure supplied to the injector, as discussed in the Igashira et al U.S. Pat. No. 4,465,060, issued Aug. 14, 1984.

Finally, in the Yamauchi et al U.S. Pat. No. 4,995,367 issued Feb. 26, 1991, there is disclosed a system for controlling fuel injection and ignition timing in an internal combustion engine operating on a mixture of gasoline and methanol in which an amount of compressed air injected with the fuel mixture through the fuel injector is controlled in accordance with the mixture ratio of the fuel mixture.

Although the above-mentioned patents disclose various types of air-assist fuel injectors which provide ways to achieve improved levels of fuel atomization, it has been difficult to produce particle sizes much below 100 $\mu$m. However, to achieve the levels of fuel economy and emission control embodied in low emission vehicle (LEV) and ultra low emission vehicle (ULEV) regulations now proposed for the industry, it is important to achieve a level of atomization in fuel injection which provides a particle size of approximately 40 $\mu$m, especially for improved cold start performance.

Even more importantly, in spite of the advances in fuel injector technology for air assist of fuel injection, little attention has been given to controlling the air assist in accordance with engine operating conditions to maximize the efficiency of engine operation under such conditions as cold start, partial load (cruising), partial acceleration, partial deceleration, normal acceleration and deceleration, idle running and the like.

SUMMARY OF THE INVENTION

It is an object of the present invention to provide an air assisted fuel injection system for an internal combustion engine in which the supply of compressed air to each of the fuel injectors to air assist the injection of fuel at each cylinder is variously controlled in accordance with the status and operating conditions of the internal combustion engine.

It is a further feature of the present invention to provide an air assist fuel injection system in which it is possible to selectively control the supply of compressed air to the injectors in accordance with engine speed, load and road conditions.

It is another object of the present invention to provide an air assist fuel injection system for an internal combustion engine in which it is possible to control idle speed through the supply of compressed air to the individual fuel injectors and thereby eliminate the need for a separate idle speed control valve and bypass passage associated with the throttle valve in the intake pipe.

It is still another object of the present invention to provide an air assist fuel injection system for an internal combustion engine which includes a new fuel injector capable of producing a fuel spray of small particle size in the region of 40 microns.

It is a further object of the present invention to provide an air assist fuel injection system for an internal combustion engine which is capable of more effectively lowering emission levels in order to meet current and future low emission vehicle (LEV) and ultra low emission vehicle (ULEV) regulations The foregoing objectives are achieved in an air assist fuel injection system in which the supply of compressed air to each of the fuel injectors is controlled in accordance with engine operating conditions to take into consideration both load and road conditions. More particularly, for cold start operation, compressed air is supplied continuously to the fuel injectors to enhance cold start performance On the other hand, for partial load (cruising) and partial acceleration conditions a pulsating (air volume control) supply of compressed air is employed, with air assist being initiated at each fuel injector a predetermined time prior to fuel injection and the supply of compressed air being maintained for a predetermined time following the end of fuel injection coincident with each fuel injection pulse. However, for deceleration or full acceleration conditions, air assist is typically inhibited to improve engine response during full acceleration and achieve fuel economy during deceleration.

A further feature of the selective control of air assist in fuel injection in accordance with the present invention involves the control of idle speed. By providing a pulsating (air volume control) supply of compressed air to the fuel injectors when the internal combustion engine is operating in an idle state, the quantity of air being supplied to each cylinder can be controlled at the individual fuel injector to control idle speed. In this way, the conventional idle speed control valve and bypass passage associated with the throttle valve for controlling idle speed can be totally eliminated, thereby simplifying the internal combustion engine control system and providing a precise control over idle speed, while enhancing fuel injection performance.

The air assist fuel injection system in accordance with the present invention is further enhanced by use of an electromagnetic fuel injector in which both the fuel and the compressed air are swirled to achieve higher levels of atomization. In particular, by swirling the fuel in a direction opposite to that in which the air is swirled, particle sizes in the vicinity of 40 microns can be obtained in the resulting fuel spray. For this purpose, the electromagnetic fuel injector provides a fuel swirl plate which operates to swirl the fuel flowing along the fuel passage within the injector in a first direction, followed by an air swirl plate which swirls compressed air supplied to the injector in a second direction, opposite the first direction. The swirling fuel is introduced into the swirl of compressed air along the fuel passage within the injector, causing the liquid fuel to be broken up into extremely fine droplets which are then injected as a fine fuel spray.

These and other objects, features and advantages of the present invention will become more apparent from the detailed description of the preferred embodiments taken in conjunction with the accompanying drawings.

DESCRIPTION OF THE PREFERRED EMBODIMENTS

In the following, a fuel supply system and fuel injection apparatus according to an embodiment of the present invention will be described, referring to the accompanying drawings.

Figure 1:
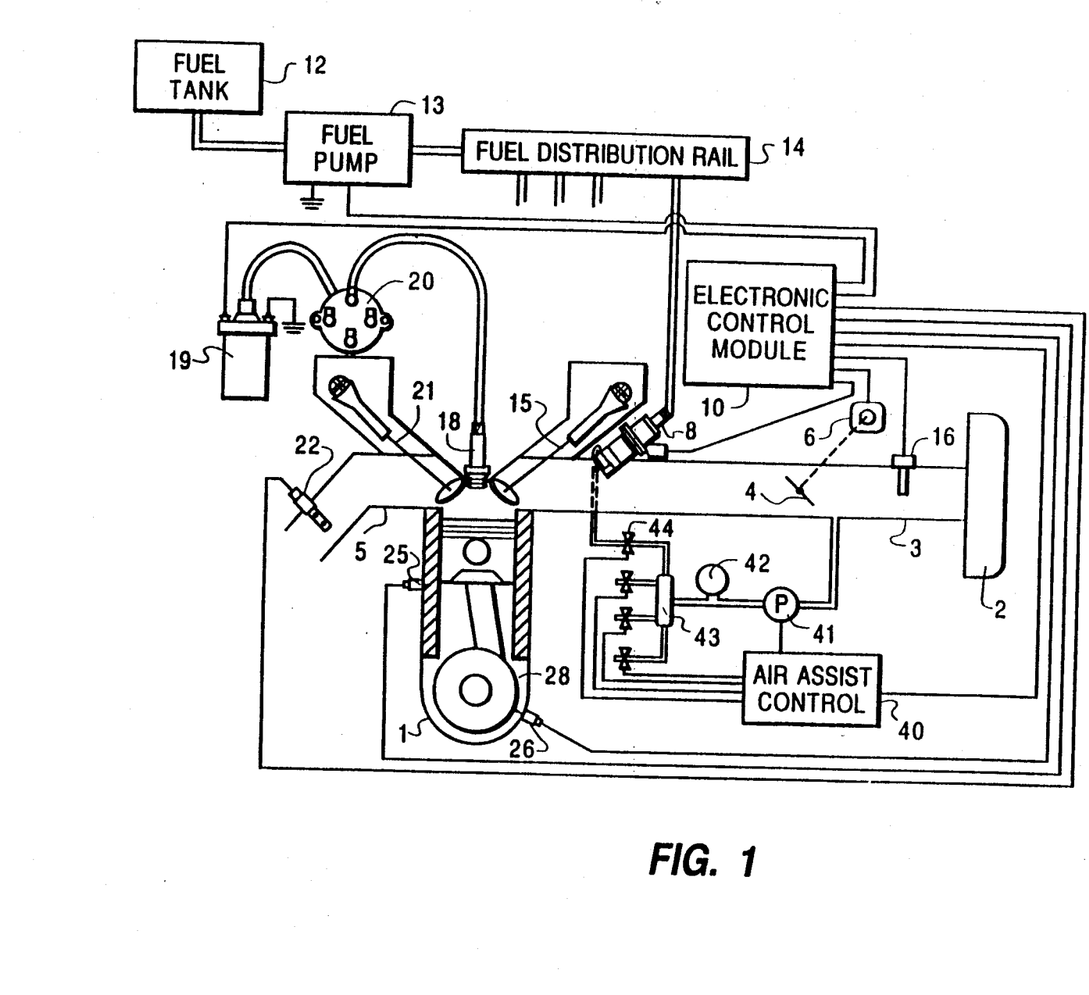
FIG. 1 is a basic schematic diagram illustrating an embodiment of an air assist fuel injection system in accordance with the present invention.

FIG. 1 of the accompanying drawings schematically shows an example of an internal combustion engine control system, to which the features of the present invention are applied As apparent from the figure, internal combustion engine 1 has a known structure, i.e., it coupled with an intake pipe 3 which supplies intake air received via an air cleaner 2 to the cylinders of the engine 1 and an exhaust pipe 5 for discharging exhaust gas from the engine 1. The quantity of intake air supplied through the intake pipe 3 is controlled by a throttle valve 4, the position of the throttle valve being detected by a throttle valve sensor 6.

The intake pipe 3 is provided with a fuel injector 8, which injects a predetermined amount of fuel supplied from a fuel tank 12 by a fuel pump 13 via a fuel distribution rail 14 into the intake pipe 3 adjacent intake valve 15 in response to an injection pulse signal applied thereto from the electronic control module 10, whereby a fuel mixture of a predetermined air/fuel (A/F) ratio is supplied to the engine 1. For this purpose, the quantity Q of the intake air is detected by an air flow sensor 16 positioned within the intake pipe 3 upstream from the throttle valve 4.

A spark plug 18, provided in each cylinder of the internal combustion engine to ignite the fuel mixture, is controlled from the electronic control module 10 via an ignition coil 19 and ignition distributor 20 in accordance with the required ignition timing.

The exhaust pipe 5 is provided with an oxygen sensor 15, which detects the concentration of residual oxygen included in the exhaust gas discharged from the cylinder of the engine 1 via the exhaust valve 21 and produces a signal representative of the actual A/F ratio of the mixture supplied to the engine 1

On a cylinder block of the engine 1, there is installed a temperature sensor 25 for detecting the temperature of the cooling water of the engine 1. In the engine 1, there is further provided a crank angle sensor 26, associated with the crankshaft 28 of the engine 1, for detecting the rotation of the crankshaft and the upper dead points (TDC) of respective cylinders of the engine 1, from which the electronic control module 10 determines various operating conditions, including the speed of rotation (RPM) of the engine and the ignition timing.

In a typical engine control system, the electronic control module 10 includes a microprocessor which executes a predetermined data processing on the basis of received detection signals under control of a stored program. Generally, this data processing is carried on as follows, although details thereof will be understood by those of skill in this art.

An amount of intake air of the engine 1 is at first calculated on the basis of the engine rotational speed, which is obtained from the crank angle signal outputted by the sensor 26, and the output signal from the air flow sensor 16. An amount of fuel to be injected is determined in response to the calculated intake air amount and the rotational speed of the engine. Further, the thus obtained fuel amount is corrected on the basis of an A/F ratio signal fed back from the sensor 22 to determine a final amount of fuel to be injected. Various correction factors for correcting the fuel injection amount and fuel injection timing, as well as the ignition timing, are also determined by the electronic control module 10 in accordance with various detected operating parameters of the system, including water temperature as determined by the sensor 25.

A pulse signal having a pulse width corresponding to the final amount of fuel to be injected is formed as an injection pulse signal by the electronic control module 10, which actuates the injector 8 and causes it to inject a predetermined amount of fuel.

Figure 2:
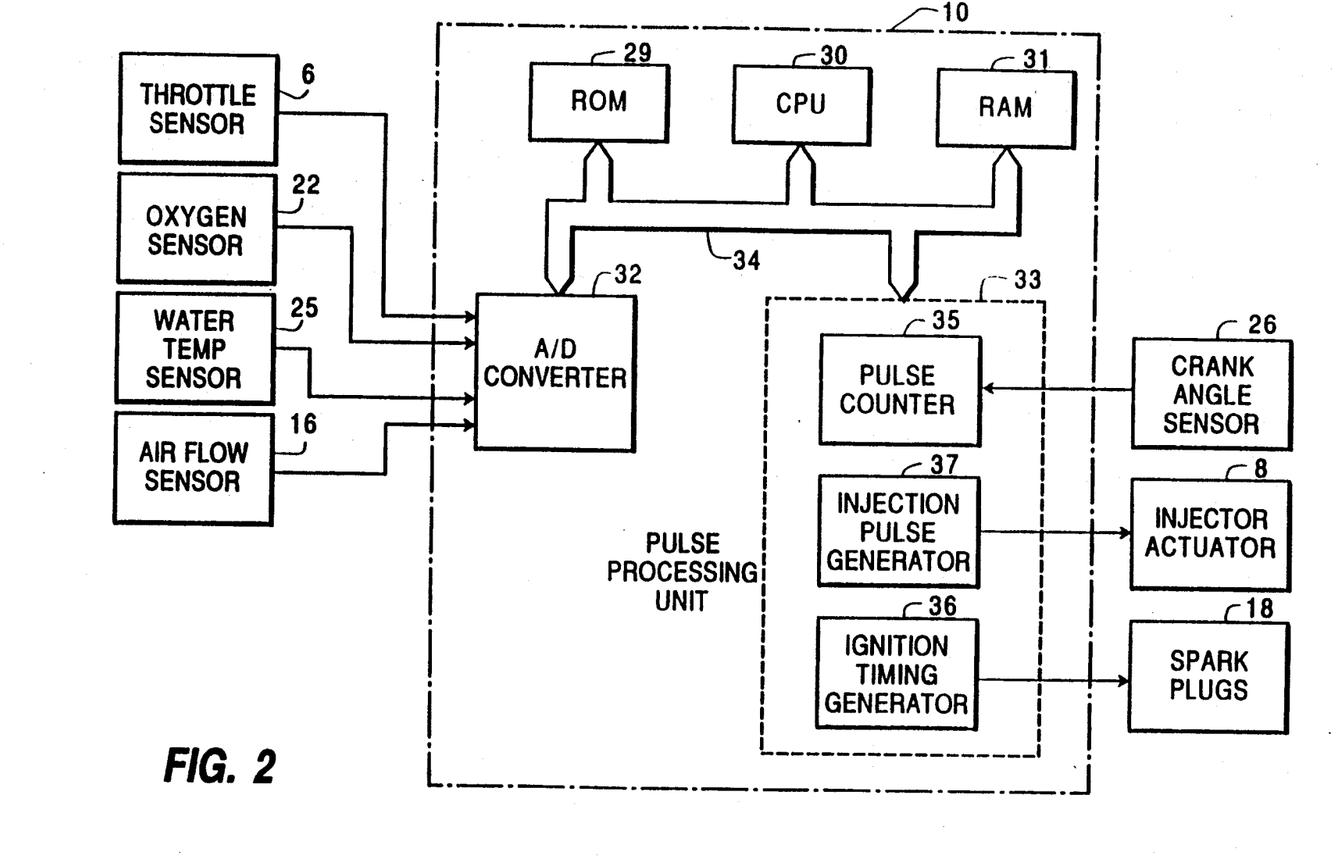
FIG. 2 is a schematic block diagram illustrating details of the electronic control module as employed in the system of FIG. 1.

FIG. 2 is a block diagram schematically showing details of the electronic control module 10. As apparent from the figure, the electronic control module 10 includes a microprocessor composed of a central processing unit (CPU) 30 for executing a predetermined data processing, a read-only memory (ROM) 29 for storing programs to be executed by the CPU 30 for the predetermined data processing and various constants necessary for execution of the programs, and a random access memory (RAM) 31 for storing data to be processed by the CPU 30 and process results obtained during execution of the programs.

The CPU 30, ROM 29 and RAM 31 are coupled with each other by common bus 34. Further, analog-to-digital (A/D) converter 32 is coupled to the common bus 34. The A/D converter 32 receives analog signals outputted by the various sensors, including the throttle sensor 6, oxygen sensor 22, water temperature sensor 25 and air flow sensor 16, and converts the output signals of these sensors into digital signals for processing by the CPU 30. Furthermore, a pulse processing unit 33 is coupled to the common bus 34, and includes a pulse counter 35 for counting pulses produced by the crank angle sensor 26 to detect the rotational speed of the engine 1, an injection pulse generator 37 for generating an injection pulse signal to operate the injector 8 and an ignition timing generator 36 for generating an ignition signal to actuate the spark plugs 18 on the basis of the result of processing by the microprocessor.

One of the features of the present invention involves the use of air assist in the injection of fuel from the fuel injectors 8. For this purpose, as seen in FIG. 1, air is drawn from the intake pipe 3 upstream of the throttle valve 4 by a pump 41 which supplies compressed air via a line having an accumulator 42 to an air distribution rail 43. The compressed air supplied to the distribution rail 43 is applied to the individual fuel injectors 8 associated with each of the cylinders of the engine via a respective control valve 44, operated under control of an air assist control unit 40, which also controls the operation of the pump 41.

In the example illustrated in FIG. 1, a separate fuel injector 8 is provided for each cylinder of the engine, and the compressed air supplied to each fuel injector 8 is controlled individually by a respective control valve 44 under control of the air assist control unit 40. However, in those engine control systems having single point injection involving the use of only a single fuel injector for all cylinders of the engine, it will be understood that compressed air will be supplied to the single fuel injector via a single control valve under control of the air assist control unit 40.

In many engine control systems, idle speed control (ISC) is typically effected by controlling a quantity of air which is allowed to bypass the throttle valve through a bypass passage extending from upstream of the throttle valve to a point downstream of the throttle valve. Thus, under idling conditions where the throttle valve is closed, the idle speed is controlled by the quantity of air flowing through the bypass passage However, by use of the air assist fuel injection system of the present invention, it is possible to eliminate the use of a bypass passage and idle speed control valve provided therein, since idle speed can be controlled by controlling the quantity of air being supplied to the individual fuel injectors, as will be described in more detail hereinafter. This possibility of eliminating the idle speed control valve and bypass passage not only simplifies the engine control system, but control of idle speed by controlling the air assist supplied to the individual fuel injection valves provides a more accurate and efficient control over the idle speed.

As already indicated, the provision of air assist for fuel injection has been employed in prior systems as a means of reducing the fuel particle size of the fuel spray produced by the fuel injector and thereby improve the combustion efficiency provided within the internal combustion engine. However, no consideration has been given previously to the control of the air assist to the fuel injectors on the basis of the various operating conditions of the engine. Thus, a main feature of the present invention is to provide individual control over the air assist to the fuel injection depending on the road-/operation status of the vehicle, such as cold start, partial load (cruising), partial acceleration, partial deceleration, acceleration, deceleration and idle speed control This individual control provided for various operating conditions is effected by the air assist control unit 40, which may be provided as a microprocessor system operating under program control similar to that of the electronic control module 10. In the alternative, the air assist control unit 40 may be incorporated into the electronic control module 10, with the result that air assist to the fuel injectors will be controlled by the microprocessor within the electronic control module 10 along with control over fuel injection amount, fuel injection timing and ignition timing.

Figure 3:
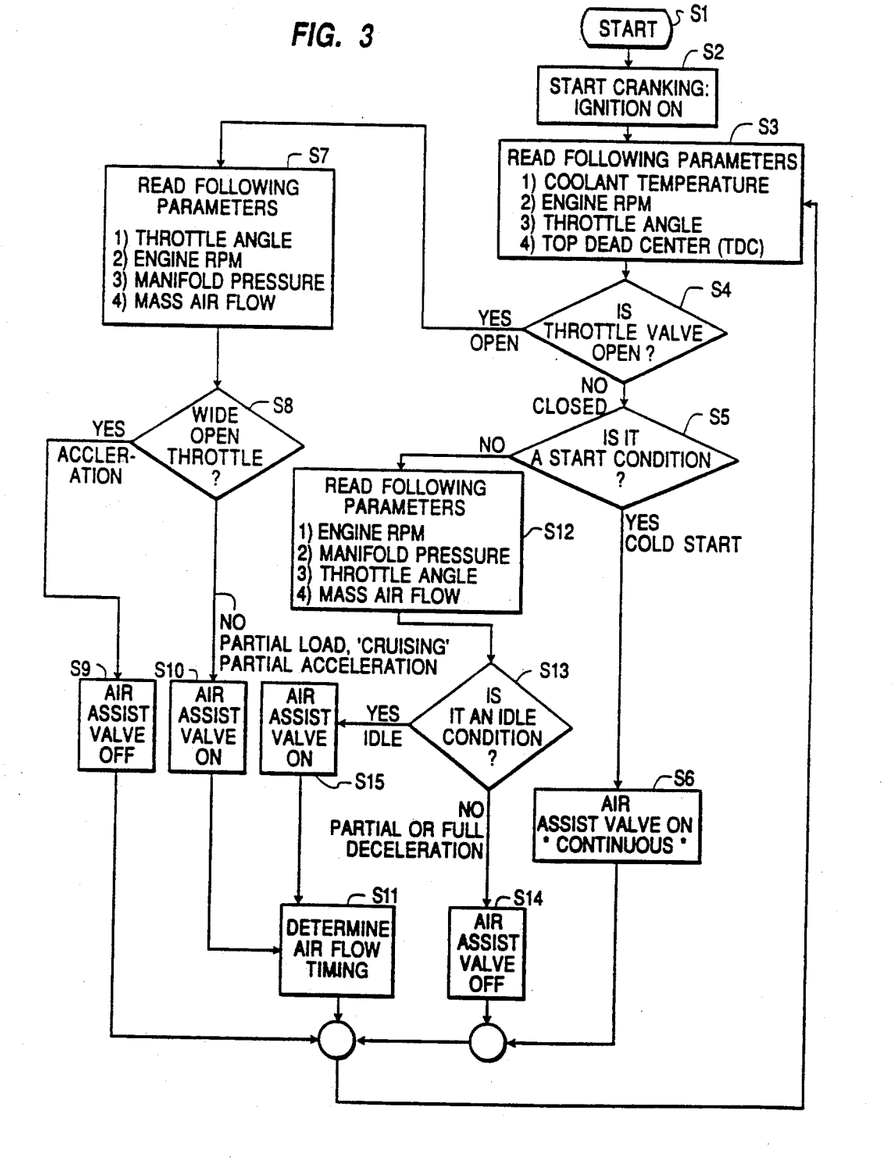
FIG. 3 is a flow diagram illustrating the control features and operations of the air assist control unit in the system of FIG. 1.

The microprocessor which controls the air assist to the fuel injectors in accordance with the present invention, as embodied in the air assist control unit 40 or in the electronic control module 10, operates under the control of a program to provide a processing as shown by the flowchart illustrated in FIG. 3, to control air assist in accordance with a different operating conditions of the engine and different vehicle driving conditions.

Air assist control in accordance with the present invention will require the following five parameters from the engine:

(1) Coolant temperature is necessary to check engine status for cold start. The temperature at which the engine is considered to be warmed-up is typically about 80° C.

(2) The top dead center (TDC) position of the crankshaft is monitored to determine the position of the crankshaft at which it is necessary to open the appropriate air valve 44 for each cylinder of the engine.

(3) Crank angle information is necessary to regulate the air pulse width of air supplied to the fuel injector, and therefore the amount of air flowing in the intake manifold.

(4) Throttle angle is monitored for all load conditions, including acceleration and deceleration.

(5) The injector pulses are also monitored in order to synchronize the opening of the air valves 44 in the overall operation of the air assist fuel injection system.

Referring to FIG. 3, the operation of the air assist fuel injection system starts at step S1 when power energizes the engine control system. At step S2, the ignition is on and cranking of the internal combustion engine is started. In step S3, the electronic control module 10 reads various parameters from the sensors within the system, including coolant temperature, engine RPM, throttle angle and top dead center (TDC).

Figure 4A:
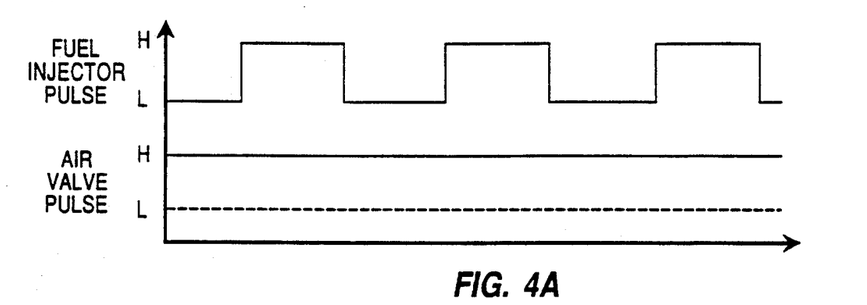
FIGS. 4A–4E are waveform diagrams illustrating the fuel injector operation and air valve operation employed in the air assist for different operating conditions of the internal combustion engine.

In step S4, it is determined from the output of the sensor 6 whether the throttle valve is open. Since the engine is being started at this time, the throttle valve is found to be closed, and so the processing advances to step S5, in which it is determined whether or not the engine is in a start condition At this point, the engine is in a start condition, and so the processing will shift to step S6 in which the air assist valve 44 in conjunction with each cylinder of the engine will be turned on for continuous operation, as shown in FIG. 4A. The process will then shift back to step S3, and the various engine parameters as determined by the water temperature sensor 25, crank angle sensor 26 and throttle sensor 6 will be read and updated.

Figure 4B:
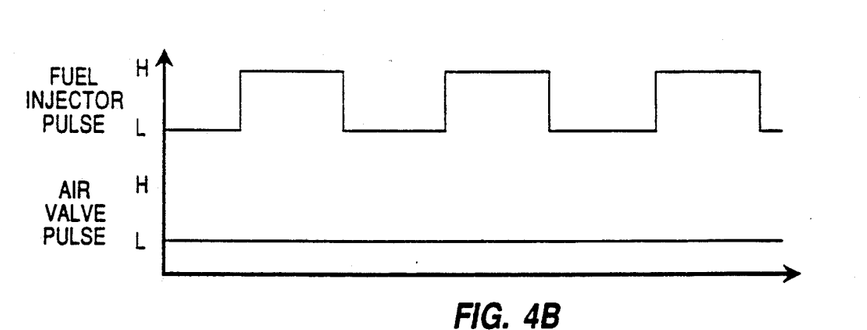

In step S4, it is again determined from the sensor 6 whether the throttle valve is opened. If the throttle valve 4 is detected in the open condition at this point, the processing shifts to step S7 in which parameters such as throttle angle, engine RPM and manifold pressure are again read and updated. In step S8, it is then determined from the throttle angle whether the throttle valve 4 is wide open (indicating acceleration) or not wide open (indicating partial load or partial acceleration). If it is found in step S8 that the throttle valve 4 is wide open, indicating acceleration, the processing shifts to step S9 and the air assist control unit 40 operates to turn off the air assist valves 44 to eliminate the air assist during acceleration, as seen in FIG. 4B. This provides for a more immediately rich mixture of fuel being injected at each cylinder to assist the response of the engine in acceleration of the vehicle. The processing then shifts back from step S9 to step S3 and will continue through the steps S4, S7, S8 and S9 so long as the acceleration state continues.

Figure 4C:
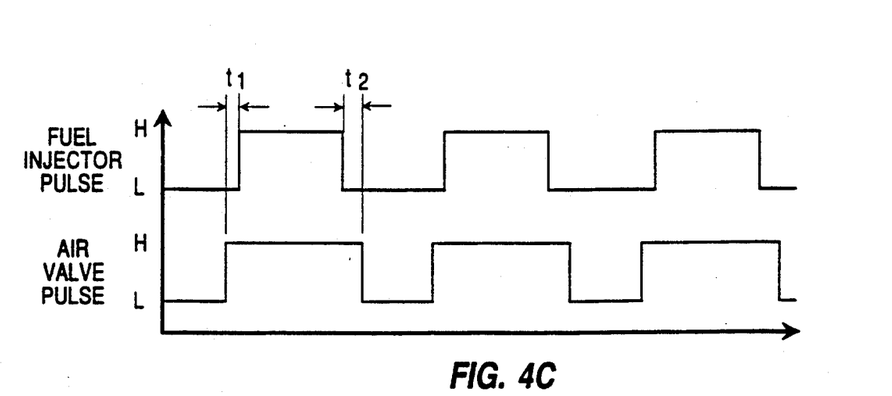

In step S8, if it is found that the throttle valve is not wide open, indicating partial load (cruising) or partial acceleration, the processing shifts to step S10 in which the air assist valves 44 are either maintained in the on state or switched to the on state, and in step S11, the duration and timing of on/off control of the air assist valves 44 is determined in accordance with the required air volume control. As seen in FIG. 4C, the air assist valves 44 are operated for partial load and partial acceleration in a pulsating manner so as to be turned on a predetermined time $t_1$ prior to initiation of the fuel injector pulse and to be turned off a predetermined time $t_2$ following the trailing edge of the fuel injector pulse so that the A/F ratio is maintained between 14 and 15, i.e. in the range of the stoichiometric value (14.7). After step S11, the processing returns to step S3 and will continue by repeating the steps S4, S7, S8, S10 and S11 so long as partial load (cruising) or partial acceleration continues.

Figure 4D:
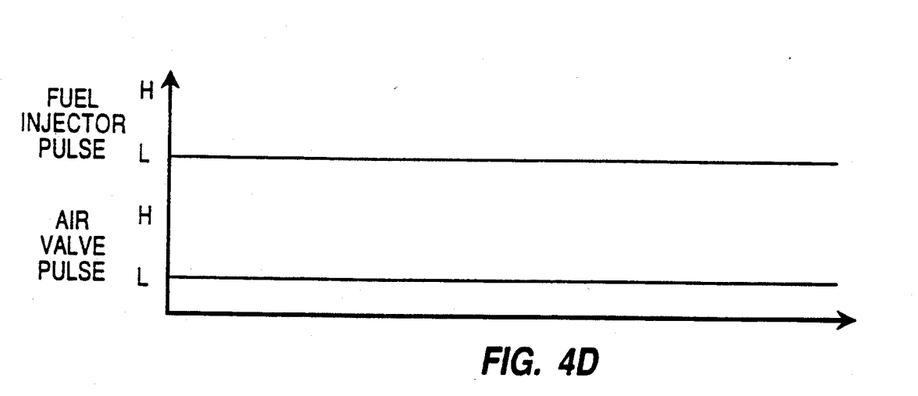

If in step S4, it is determined from the throttle valve sensor 6 that the throttle valve 4 is closed, the processing shifts to step S5, where it is determined whether the engine is in a start condition. If the engine is not in a start condition, the processing shifts to step S12 in which engine RPM and manifold pressure are read and updated. It is then determined in step S13 from these parameters whether the engine is operating in an idle condition. If it is not operating in an idle condition, indicating partial or full deceleration of the vehicle, the air assist valves 44 are controlled to be turned off so as to eliminate air assist to the fuel injectors, as shown in FIG. 4D. The processing then shifts back to step S3, and will continue through the steps S4, S5, S12, S13 and S14 so long as partial or full deceleration continues.

If it is determined in step S13 that the engine is operating in an idle state from the read values of engine RPM and manifold pressure, the processing will shift to step S15 in which the air assist valves 44 are turned on and controlled in step S11 in the manner shown in FIG. 4C, similar to that for partial load and partial acceleration, and the quantity of air supplied by each air pulse will be controlled to maintain the request idle speed. The processing will then shift back to step S3, and will continue through steps S4, S5, S12, S13, S15 and S11 so long as the idle condition is maintained.

Figure 4E:
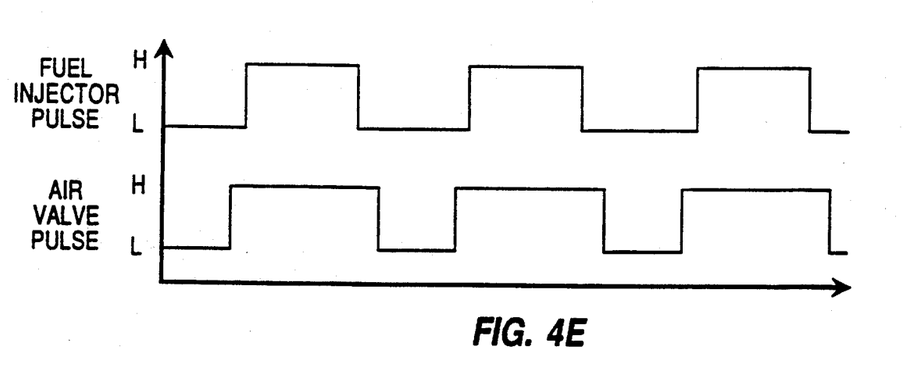

Although it is indicated above that, in step S9, the air assist valves 44 are turned off during acceleration of the engine, as indicated by a wide open throttle in step S8, thereby providing for quick responsiveness in the acceleration of the engine through injection of a richer mixture of fuel in each cylinder, it is also possible to provide for a more economic driving condition during acceleration by maintaining operation of the air assist valve 44 in step S9 in a pulsating manner, as shown in FIG. 4E. The economy driving condition produced by the pulsing of the air assist valves 44 in the manner shown in FIG. 4E may be effected in the same manner as the control provided for partial load, partial acceleration and idle control, as described with reference to FIG. 4C.

Figure 5:
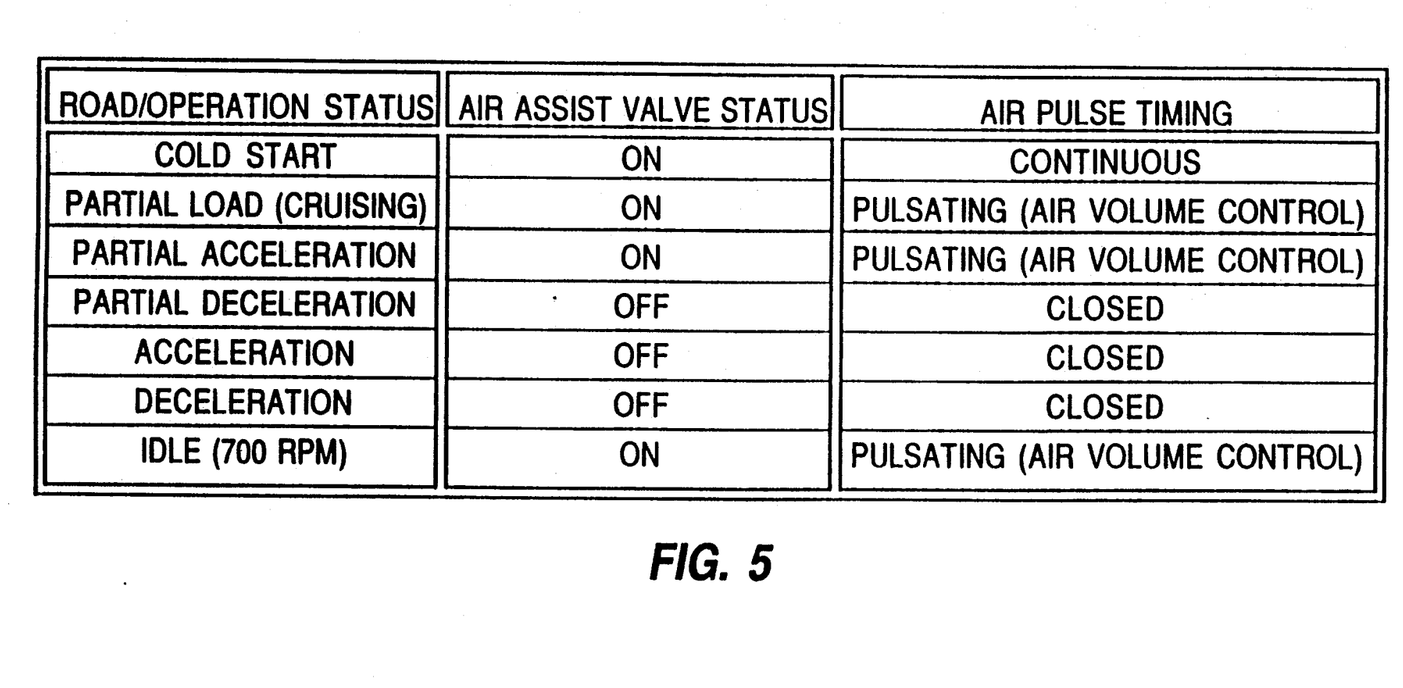
FIG. 5 is a chart indicating the air assist valve status and air pulse timing for each of a plurality of road/operation status conditions of the internal combustion engine.

FIG. 5 shows a table in which the operating condition of the air assist valve 44 and the air pulse timing for each of various road/operation status conditions of the vehicle. As can be seen from this table, for cold start operation, the air assist valves 44 are controlled to be on continuously. For partial load (cruising) and partial acceleration, the air assist valves 44 are operated in a pulsating manner to provide for air volume control. In conditions of partial deceleration, acceleration and deceleration, the air assist valves 44 are turned off so that no air assist is provided to the fuel injection valves. Finally, for idle speed control, the air assist valves 44 are controlled in a pulsating manner to again provide air volume control necessary to maintain the desirable idle speed, which is typically 700 RPM.

By providing such control over the air assist supplied through the fuel injection valves, it is possible to totally eliminate the need for the standard idle speed control (ISC) valve in a bypass passage associated with the throttle valve 4, since the air assist control will provide for control over the amount of air required by the engine to maintain the proper idle speed. In fact, as can be appreciated from the foregoing description, the air assist control provided in accordance with the present invention is capable of controlling the amount of air required by the engine for any speed and any load.

On the other hand, the air assist system of the present invention can also work in conjunction with the standard ISC valve, thereby enabling the air assist system of the present invention to be applied to engines which already include a standard ISC type of control. However, where the system can be designed without the need for the idle speed control system apart from the air assist provided to the fuel injectors, the overall system cost is lowered and the need to control both the ISC valve and the air assist system is eliminated.

By providing various types of control over the air assist provided at each fuel injector, it is possible to provide a unique type of control for engine operation under different road/operation status conditions, thereby providing for a more efficient and more responsive engine control. These features can be further enhanced by employing a fuel injector in which the air assist is utilized in such a way as to more effectively control the particle size to achieve a fuel spray at each injector which will insure efficient combustion and minimum amounts of harmful emission.

Figure 6:
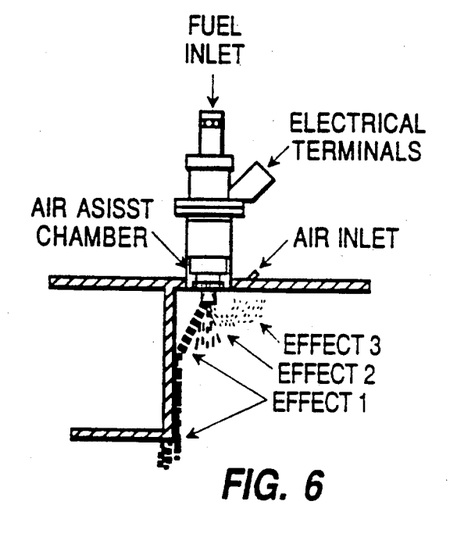
FIG. 6 is a schematic diagram used to explain the effects of compressed air on fuel injection.
Figures 7A, 7B:
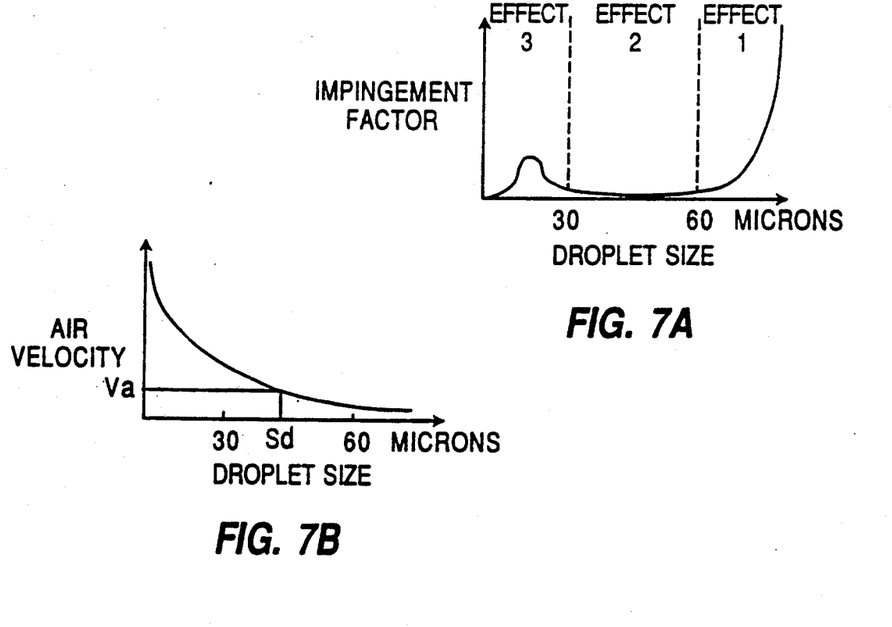
FIG. 7A illustrates the relationship between droplet size and impingement factor in the injection of fuel by an electromagnetic fuel injector.
FIG. 7B illustrates the relationship between droplet size and air velocity in an air assist fuel injector.

FIG. 6 shows a fuel injector operating with air assist and illustrates the effect of compressed air on the air assist injection system. FIG. 7A is a representation of the impingement factor of the fuel particles on adjacent wall surfaces versus the droplet size, while FIG. 7B illustrates the influence of air velocity on droplet size.

As seen in FIG. 6, a first affect is achieved when the air assist involves the use of a low air velocity. FIG. 7B shows that, with a low air velocity, the droplet size will be relatively large, and FIG. 7A shows that as the particle size increases beyond 60 microns, the impingement factor increases significantly with the result that a significant amount of fuel will deposit as a thick layer on the adjacent walls of the intake pipe, undesirably affecting the proper metering of the fuel and efficient and responsive operation of the internal combustion engine.

A second affect is achieved when the droplet size is in a range of 30 to 60 microns, as seen in FIG. 7A. The preferable droplet size for good atomization results is approximately 40 microns, which results in a well balanced fuel flow.

A third affect is achieved at high levels of air velocity which results in a very high level of particle atomization. Under these conditions, the particles are extremely small, i.e. below 30 microns and have a tendency to drift away from the area of fuel convergence in accordance with what is known as the "eddy effect".

As can be seen from FIG. 7A, the impingement factor, which indicates the amount of injected fuel impinging on adjacent walls of the intake pipe and valve surfaces, is a minimum in the range of droplet size between 30 and 60 microns. In practice, this impingement factor will also depend closely on temperature and will increase as the temperature decreases and vice versa. At high engine temperatures, the impingement factor will decrease somewhat for a fuel spray of larger particle size as vaporization of the fuel at the surfaces of the intake pipe and valve surfaces occurs with the higher temperatures.

As seen in FIG. 7B, for optimal operation of the air assist injection system, the air velocity Va and the droplet size Sd are selected so that a droplet size of approximately 40 micrometers is obtained. The air velocity Va will depend on the air pressure produced by the system and the diameter of the air inlet tube to the fuel injector, and so air pressure and inlet tube diameter are selected so as to produce a spray having a droplet size of approximately 40 microns.

Figure 8:
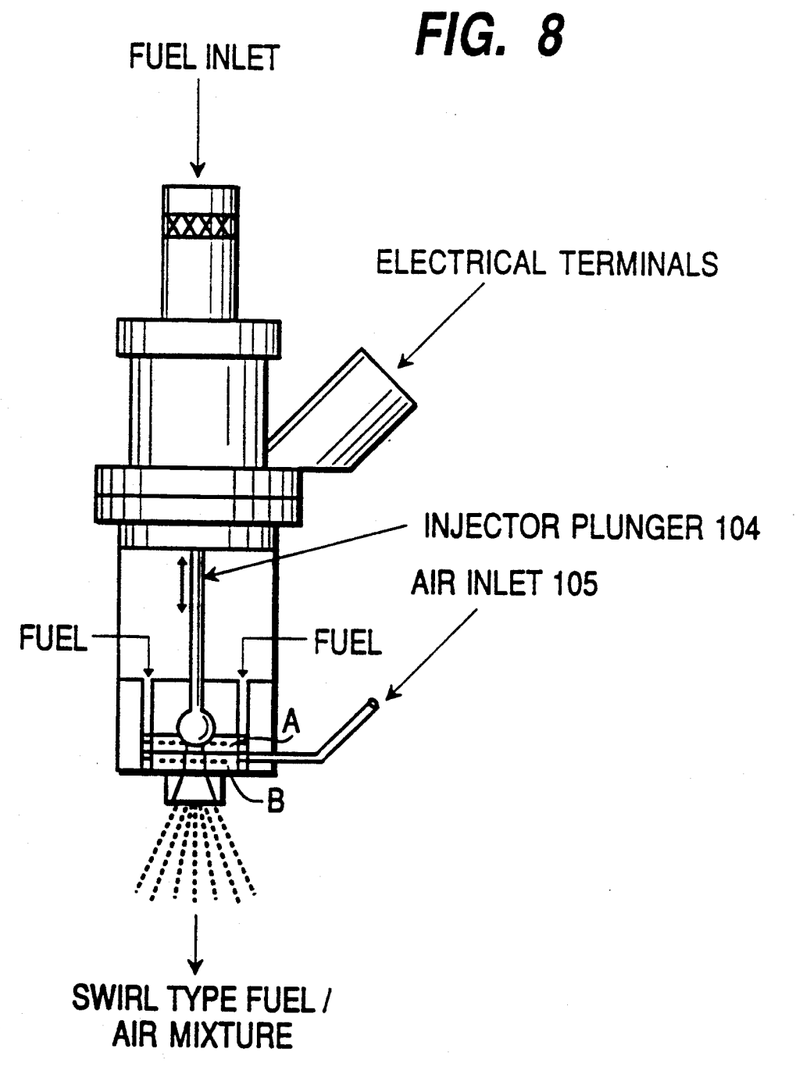
FIG. 8 is a schematic diagram of an electromagnetic fuel injector embodying air assist features of the present invention.

FIG. 8 schematically illustrates an electromagnetic fuel injector incorporating the air assist feature of the present invention so as to provide a fuel spray having a particle size in the region of 40 microns, as required for efficient combustion, easier cold start, and low fuel consumption. For this purpose, the fuel injector is provided with both a fuel swirl plate A and an air swirl plate B disposed successively along the fuel flow path at the nozzle end of the injector. The injector plunger 104 having a ball valve at one end thereof in contact with a valve seat provided in the fuel swirl plate A is lifted in response to actuation of the injector to meter the fuel which passes through and is swirled by the fuel plate A. The swirled fuel metered by the ball valve and valve seat arrangement then passes into a chamber formed in the air swirl plate B where it is subjected to a rotating stream of compressed air supplied by way of the air inlet 105. The interaction between the swirling stream of compressed air and the swirling stream of fuel causes the fuel to be broken up into fine particles, which are then ejected through the nozzle portion of the injector as a fine spray.

Figure 9:
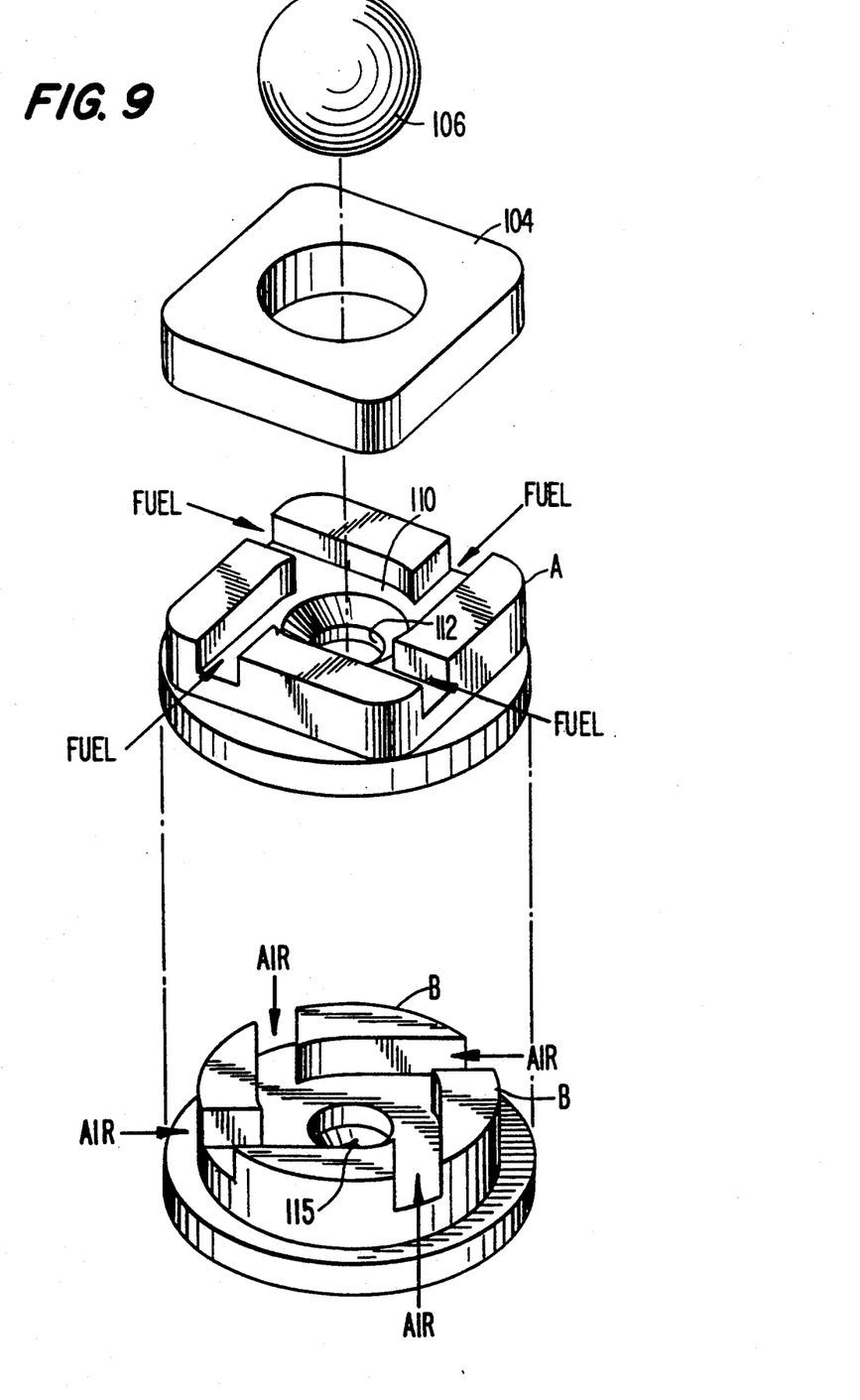
FIG. 9 is an exploded view of a portion of the electromagnetic fuel injector of the present invention showing the fuel swirl plate and air swirl plate.
Figure 10A:
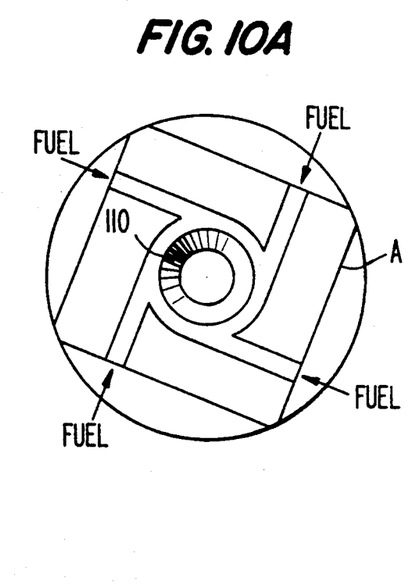
FIGS. 10A and 10B are top views of the fuel swirl plate and the air swirl plate, respectively, as employed by the present invention.
Figure 10B:
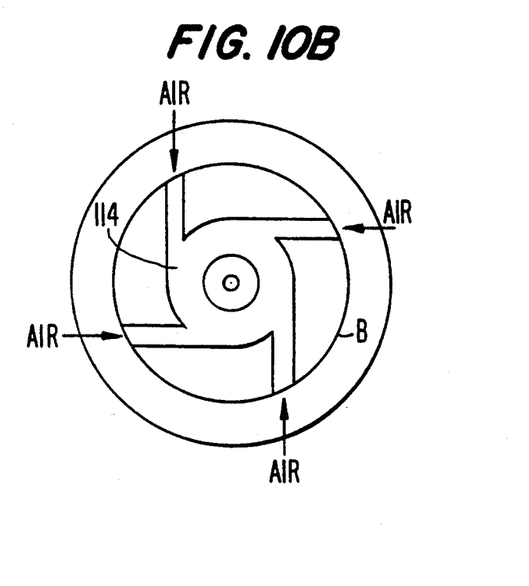

FIG. 9 is an exploded view showing more details of the fuel swirl plate A and the air swirl plate B. FIG. 10A is a top view of the fuel swirl plate A, while FIG. 10B is a top view of the air swirl plate B. As can be seen from these figures, both the fuel swirl plate A and the air swirl plate B are provided with grooves which tangentially communicate with a central chamber concentric with a fuel passage; however, it will be noted that the direction at which the grooves enter the central chamber 110 in the fuel swirl plate A is opposite to the direction in which the grooves enter the central chamber 114 in the air swirl plate B. Thus, fuel which flows along the grooves in the plate A into the central chamber will be rotated in a clockwise direction, as seen particularly from the top view in FIG. 10A; while, air which is introduced through the grooves in the swirl plate B will enter the central chamber and rotate in a counter clockwise direction as seen more clearly in FIG. 10B. The fuel swirling in a clockwise direction will pass down through the fuel passage in the fuel swirl plate A and enter the central chamber in the air swirl plate B in which the air is swirling in a counter clockwise direction. The fuel flow will therefore be directed against the air flow to provide a smaller droplet size in the swirled fuel and air mixture.

Figure 11:
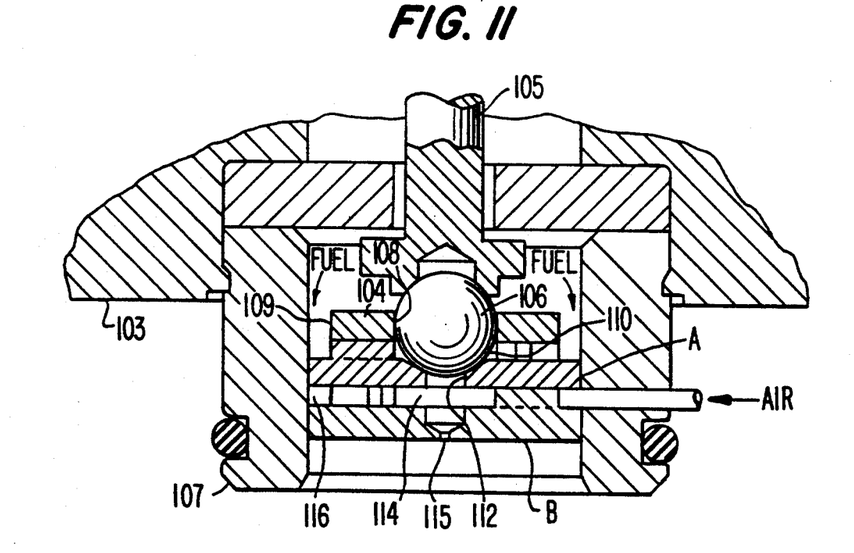
FIG. 11 is a cross-sectional view of the nozzle end of an electromagnetic fuel injector employing a fuel swirl plate and air swirl plate according to the present invention.

The air assist features of the present invention, as described with reference to FIGS. 8-10, can be incorporated into an electromagnetic fuel injector, such as that disclosed in the Okamoto et al U.S. Pat. No. 4,887,769. FIG. 11 illustrates details of the nozzle portion of such an electromagnetic fuel injector, which incorporates the air assist features of the present invention, including the swirling of both the fuel stream and the compressed air stream utilizing the fuel swirl plate A and air swirl plate B as described with reference to FIGS. 8 and 9.

Looking to FIG. 11, a valve guide 107 is mounted in the tip end of a yoke 103 of the fuel injector, the valve guide 107 accommodating a ball valve 106 which cooperates with a valve seat formed in the fuel swirl plate A. The ball valve 106 is coupled to a rod 105 having an armature (not shown) formed at the other end thereof, so that actuation of the electromagnetic fuel injector produces axial movement of the rod 105 and ball valve 106 to displace the ball valve 106 from the valve seat to permit fuel to flow through the fuel passage, as typically provided in an electromagnetic fuel injector.

The ball valve 106 is guided by an inner circumferential surface 108 of a plate 104 having axial grooves 109 in the outer peripheral surfaces thereof to form a fuel passage through which fuel passes to the fuel swirl plate A. The fuel enters the tangential grooves in the fuel swirl plate A under the fuel pressure supplied by the fuel pump and is swirled within the central chamber 110 of the swirl plate A. When the ball valve 106 is displaced from the valve seat upon actuation of the electromagnetic fuel injector, the swirling fuel passes down through the port 112 and into the central chamber 114 of the air swirl plate B.

Air is introduced by way of the air conduit from the air assist valve 44 into an annular chamber 116 formed in the swirl plate B, and the compressed air then enters into the tangential grooves and is introduced into the central chamber 114 where it swirls in an opposite direction to that of the swirling fuel also introduced into the chamber 14 from the port 112. This collision between counter rotating streams of air and fuel results in a breaking up of the fuel into minute particles which are then ejected through the port 115 as a fine spray of fuel particles having a particle size in the vicinity of 40 microns.

While FIG. 9 shows a fuel swirl plate A and an air swirl plate B each including four inlets for fuel and air, respectively, it is to be understood that, depending on air velocity requirements to achieve the desired particle size, a fuel swirl plate A and air swirl plate B having less than four inlets for fuel or air are also possible in accordance with the present invention. Indeed, it is not necessary that both the fuel swirl plate A and the air swirl plate B have the same number of inlets, and so it is possible to provide an arrangement in which the fuel swirl plate A has more inlets for fuel than the number of air inlets provided on the air swirl plate B, and vice versa.

Further, although FIGS. 8 and 11 show fuel flow axially through the injector, it is also possible to supply fuel through a conduit directly to the fuel swirl plate A in a manner analogous to application of compressed air to the air swirl plate B. In such case, the disk 104, as seen in FIG. 9, is provided as a circular disk to eliminate the fuel passages at the sides thereof.

Additionally, while a preferred embodiment of an electromagnetic fuel injector has been described with reference to FIGS. 8-11, it is to be understood that the air assist fuel injection system of FIG. 1 does not require a fuel injection valve having the particular construction described with reference to FIG. 8. In this regard, the supply of compressed air to the fuel injector is an integral part of the control provided by the system of FIG. 1, but the need for a fuel injector in which the fuel is swirled is not required to attain the advantages afforded by the type of system control described with reference to the system of FIG. 1 Further, it should be apparent that the electromagnetic fuel injector as described with reference to FIGS. 8-11 has a general application and is not limited to use in a fuel injection control system of the type described with reference to FIG. 1.

The present invention provides an air assist fuel injection system which is capable of obtaining better atomization of the fuel particles for fuel injection, reduction in noxious gases such as $NO_x$, $CO$, $CO_2$ and $HC$ in the engine emission, better combustion in each cylinder chamber, easier cold start in low temperature environments and low fuel consumption. More efficient control over engine operation by variously controlling the type of air assist provided under different conditions of engine and vehicle operation also results in superior performance of the internal combustion engine.

While the present invention has been described in terms of its preferred embodiments, it should be understood that numerous modifications may be made thereto without departing from the spirit and scope of the invention as defined in the appended claims. It is intended that all such modifications fall within the scope of the appended claims.

We claim:

1. A fuel injection system for an internal combustion engine, comprising:
    at least one fuel injector for supplying fuel to said internal combustion engine;
    a plurality of sensors for detecting various engine operating conditions, including engine speed;
    fuel supply control means responsive to detected engine operating conditions for controlling said fuel injector to supply fuel to said internal combustion engine as a series of fuel pulses in time with engine operation;
    a source of compressed air to be used in assisting fuel injection; and air-assist control means responsive to detected engine operating conditions for selectively supplying compressed air from said source to compressed air to said fuel injector, so as to air-assist the fuel injection continuously for at least one engine operating condition and intermittently for another engine operating condition, and for providing no air-assist in the case of a further engine operating condition.

2. A fuel injection system according to claim 1, wherein said internal combustion engine has an air intake pipe in which an air flow sensor is disposed, said source of compressed air being connected to said air intake pipe downstream of said air flow sensor to obtain air from air intake pipe.

3. A fuel injection system according to claim 2, wherein said source of compressed air includes an air pump and an air accumulator to compress the air obtained from said air intake pipe and supply compressed air at a constant air pressure.

4. A fuel injection system for an internal combustion engine, comprising:
 at least one fuel injector for supplying fuel to said internal combustion engine;
 a plurality of sensors for detecting various engine operating conditions, including engine speed;
 fuel supply control means responsive to detected engine operating conditions for controlling said fuel injector to supply fuel to said internal combustion engine as a series of fuel pulses in time with engine operation;
 a source of compressed air to be used in assisting fuel injection; and
 air-assist control means responsive to detected engine operating conditions for selectively supplying compressed air from said source of compressed air to said fuel injector, so as to air-assist the fuel injection in different ways for different engine operating conditions, wherein said air-assist control means includes means responsive to detected engine operating conditions for determining that said internal combustion engine is in a cold start status, and means for supplying compressed air to said fuel injector continuously while said engine is in a cold start status.

5. A fuel injection system according to claim 4, wherein said air-assist control means includes means responsive to detected engine operating conditions for determining that said internal combustion engine is in an idling status, and means for supplying compressed air to said fuel injector as a series of air pulses coincident in time with said fuel pulses injected by said fuel injector when said engine is in an idling status.

6. A fuel injection system according to claim 5, wherein said air pulses are of longer duration than said fuel pulses.

7. A fuel injection system according to claim 3, wherein each air pulse starts prior to the start of a fuel pulse by a predetermined time and continues after the end of the fuel pulse for a predetermined time.

8. A fuel injection system according to claim 5, wherein said air-assist control means further includes means for controlling the amount of compressed air supplied in each air pulse so as to control the idle speed of said internal combustion engine.

9. A fuel injection system for an internal combustion engine, comprising:
 at least one fuel injector for supplying fuel to said internal combustion engine;
 a plurality of sensors for detecting various engine operating conditions, including engine speed;
 fuel supply control means responsive to detected engine operating conditions for controlling said fuel injector to supply fuel to said internal combustion engine as a series of fuel pulses in time with engine operation;
 a source of compressed air to be used in assisting fuel injection; and
 air-assist control means responsive to detected engine operating conditions for selectively supplying compressed air from said source of compressed air to said fuel injector, so as to air-assist the fuel injection in different ways for different engine operating conditions, wherein said air-assist control means includes means responsive to detected engine operating conditions for determining that said internal combustion engine is in a partial load or cruising status, and means for supplying compressed air to said fuel injector as a series of air pulses coincident in time with said fuel pulses injected by said fuel injector when said engine is in a partial load or cruising status.

10. A fuel injection system according to claim 9, wherein said air pulses are of longer duration than said fuel pulses.

11. A fuel injection system according to claim 9, wherein each air pulse starts prior to the start of a fuel pulse by a predetermined time and continues after the end of the fuel pulse for a predetermined time.

12. A fuel injection system according to claim 9, wherein said air-assist control means includes means responsive to detected engine operating conditions for determining that said internal combustion engine is in a deceleration status, and means for inhibiting the supply of compressed air to said fuel injector when said engine is in a deceleration status.

13. A fuel injection system according to claim 9, wherein said air-assist control means includes means responsive to detected engine operating conditions for determining that said internal combustion engine is in an acceleration status, and means for inhibiting the supply of compressed air to said fuel injector when said engine is in an acceleration status.

14. A fuel injection system for an internal combustion engine, comprising:
 at least one fuel injector for supplying fuel to said internal combustion engine;
 a plurality of sensors for detecting various engine operating conditions, including engine speed;
 fuel supply control means responsive to detected engine operating conditions for controlling said fuel injector to supply fuel to said internal combustion engine as a series of fuel pulses in time with engine operation;
 a source of compressed air to be used in assisting fuel injection; and
 air-assist control means responsive to detected engine operating conditions for selectively supplying compressed air from said source of compressed air to said fuel injector, so as to air-assist the fuel injection in different ways for different engine operating conditions, wherein said air-assist control means includes means responsive to detected engine operating conditions for determining that said internal combustion engine is in an idling status, and means for supplying compressed air to said fuel injector as a series of air pulses coincident in time with said fuel pulses injected by said fuel injector when said engine is in an idling status.

15. A fuel injection system according to claim 14, wherein said air pulses are of longer duration than said fuel pulses.

16. A fuel injection system according to claim 14, wherein each air pulse starts prior to the start of a fuel pulse by a predetermined time and continues after the end of the fuel pulse for a predetermined time.

17. A fuel injection system according to claim 14, wherein said air-assist control means further includes means for controlling the amount of compressed air supplied in each air pulse so as to control the idle speed of said internal combustion engine.

18. A fuel injection system for an internal combustion engine, comprising:
   at least one fuel injector for supplying fuel to said internal combustion engine;
   a plurality of sensors for detecting various engine operating conditions, including engine speed, engine temperature, throttle valve angle and intake air amount;
   fuel supply control means responsive to detected values of intake air amount and engine speed for controlling said fuel injector to supply fuel to said internal combustion engine as a series of fuel pulses in time with engine operation;
   a source of compressed air to be used in assisting fuel injection;
   means including an air valve for connecting said source of compressed air to said fuel injector; and
   air-assist control means responsive to detected engine operating conditions for controlling said air valve so that compressed air is supplied continuously to said fuel injector during a first operating status of the engine, is supplied as a series of air pulses coincident with said fuel pulses in a second operating status of the engine, and is inhibited from being supplied to said fuel injector in a third operating status of the engine.

19. A fuel injection system according to claim 18, wherein said first operating status of the engine is a cold start status.

20. A fuel injection system according to claim 18, wherein said second operating status of the engine is an idling status.

21. A fuel injection system according to claim 20, wherein said air pulses are of longer duration than said fuel pulses.

22. A fuel injection system according to claim 18, wherein each air pulse starts prior to the start of a fuel pulse by a predetermined time and continues after the end of the fuel pulse for a predetermined time.

23. A fuel injection system according to claim 20, wherein said air-assist control means further includes means for controlling the amount of compressed air supplied in each air pulse so as to control the idle speed of said internal combustion engine.

24. A fuel injection system according to claim 18, wherein said second operating status of the engine is a partial load or cruising status.

25. A fuel injection system according to claim 18, wherein said second operating status of the engine is a partial acceleration status.

26. A fuel injection system according to claim 18, wherein said third operating status of the engine is a deceleration status.

27. A fuel injection system according to claim 18, wherein said third operating status of the engine is an acceleration status.

28. A fuel injection system according to claim 18, wherein said internal combustion engine has an air intake pipe in which an air flow sensor is disposed, said source of compressed air being connected to said air intake pipe downstream of said air flow sensor to obtain air from said intake pipe.

29. A fuel injection system according to claim 28, wherein said source of compressed air includes an air pump and an air accumulator to compress the air obtained from said air intake pipe and supply compresses air at a constant air pressure.

30. A fuel injection system for an internal combustion engine, comprising:
   at least one fuel injector for supplying fuel to said internal combustion engine;
   a plurality of sensors for detecting various engine operating conditions, including engine speed;
   fuel supply control means responsive to detected engine operating conditions for controlling said fuel injector to supply fuel to said internal combustion engine as a series of fuel pulses in time with engine operations;
   a source of compressed air to be used in assisting fuel injection;
   means including an air valve for connecting said source of compressed air to said fuel injector; and
   air-assist control means for controlling said air valve to supply compressed air from said source of compressed air to said fuel injector, including means responsive to detected engine operating conditions for determining that said internal combustion engine is in an idling status, and means for controlling said air valve to supply compressed air to said fuel injector as a series of air pulses which are coincident in time with said fuel pulses injected by said fuel injector and provide a determined quantity of air required to maintain said engine at a predetermined idle speed when said engine is in an idling status.

31. A fuel injection system according to claim 30, wherein said air pulses are of longer duration than said fuel pulses.

32. A fuel injection system according to claim 30, wherein each air pulse starts prior to the start of a fuel pulse by a predetermined time and continues after the end of the fuel pulse for a predetermined time.

33. A fuel injection system according to claim 30, wherein said internal combustion engine has an air intake pipe in which an air flow sensor is disposed, said source of compressed air being connected to said air intake pipe downstream of said air flow sensor to obtain air from air intake pipe.

34. A fuel injection system according to claim 33, wherein said source of compressed air includes an air pump and an air accumulator to compress the air obtained from said air intake pipe and supply compresses air at a constant air pressure.

* * * * *